Sept. 19, 1961     B. E. PITCHES ET AL     3,001,127
ELECTROMAGNETIC PICK-OFF DEVICES
Filed March 9, 1959
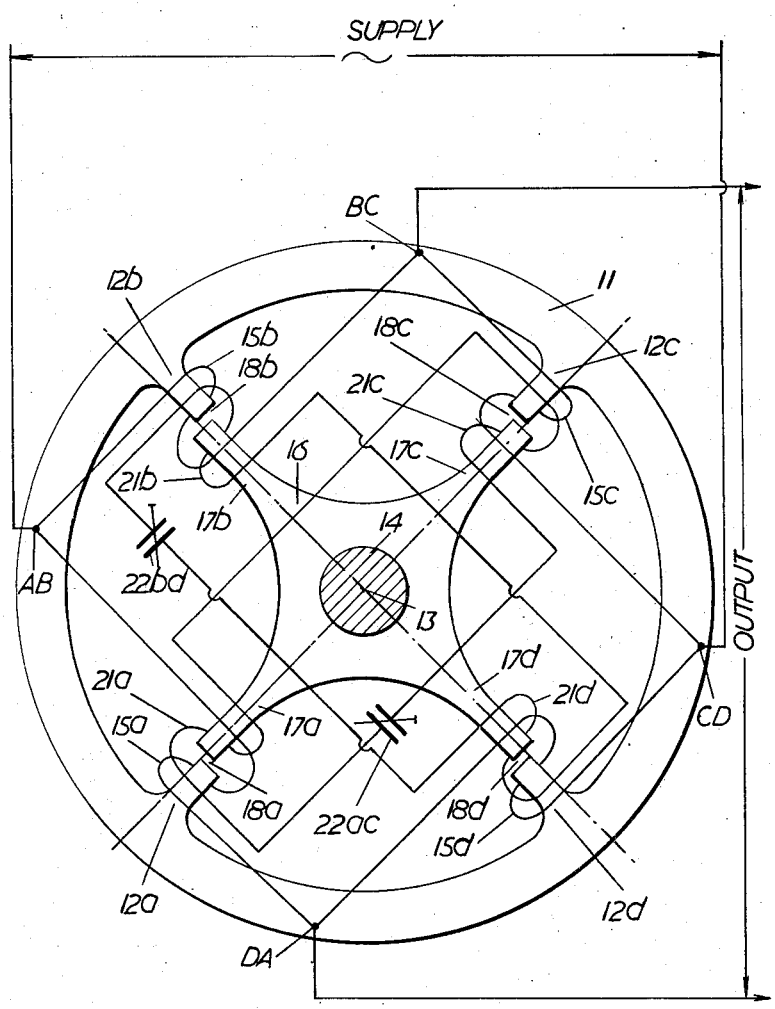
Inventors
Brian Edward Pitches
Charles Ian Crawford
By
Cameron, Kerkam & Sutton
Attorneys ର
United States Patent Office 3,001,127
Patented Sept. 19, 1961

3,001,127
ELECTROMAGNETIC PICK-OFF DEVICES
Brian Edward Pitches, Edinburgh, and Charles Ian Crawford, Newton-Stewart, Scotland, assignors to Ferranti, Limited, Hollinwood, Lancashire, England, a company of Great Britain and Northern Ireland
Filed Mar. 9, 1959, Ser. No. 798,092
Claims priority, application Great Britain Mar. 15, 1958
8 Claims. (Cl. 323—90)

This invention relates to electromagnetic pick-off devices of the type—hereinafter referred to as the type stated—for providing an alternating current (A.C.) output voltage which represents by its amplitude and phase (with respect to a source voltage) the magnitude and direction of the angular position of a shaft with respect to a datum position.

The invention has specific application to pick-offs where an unwound rotor, secured to the said shaft, co-operates with two or more pairs of wound stator poles, the poles of each pair being located diametrically opposite one another. All the windings are so connected together—for example, as an inductance bridge—and energised by the source as to supply an output voltage dependent on the relative inductances of the four windings. These inductances are in part determined by the dimensions of the airgaps between the rotor and the respective stator poles, which dimensions are dependent on the angular position of the rotor with respect to the stator. The arrangement should be such that as regards each pair of diametrically opposite stator poles the reluctance of the airgap between one pole and the rotor is equal to the reluctance of the airgap between the other pole and the rotor, for all positions of the rotor within its working range. In other words, the inductances of each pair of diametrically-opposite windings should always be equal. If this condition is not satisfied to a high degree of accuracy there will be a shift of the electrical null position—by which is meant the position which the rotor occupies for the bridge to be balanced—and this is clearly undesirable.

A difficulty arises where in normal operation such a pick-off is subjected to forces, such as those set up by high degrees of acceleration, tending to displace the rotor axis radially from its true position with respect to the stator, for any such displacement, in whatever direction, must distort from equality the reluctances of, and hence the fluxes in, at least one pair of diametrically-opposite airgaps and so adversely affect the performance of the pick-off by shifting the null position.

Another harmful effect of such an axial displacement is to cause the rotor angular position of zero torque to be angularly shifted from the electrical null position.

It might be thought that this difficulty could be overcome by sufficiently minimising the radial play of the rotor bearings, but it is usually impracticable to do this without introducing an intolerable degree of friction into the rotor movement.

An object of the present invention is to provide a pick-off device of the type stated in which the difficulty discussed above and its attendant disadvantages are sufficiently removed not to affect appreciably the accuracy of the device.

In accordance with the present invention, a pick-off device of the type stated having at least one pair of wound stator poles which are located diametrically opposite one another with respect to the axis of said shaft and which are adapted to co-operate with two rotor poles, each to each, secured to said shaft, so that the fluxes in the airgaps between the stator poles and the rotor poles are equal when the rotor is in its true axial position, includes for each stator pole an auxiliary winding in addition to the main winding, and interconnections between the two auxiliary windings of said pair such that the voltages induced in the auxiliary windings by the respective main windings are in counterphase with one another, the arrangement being such that on a radial displacement of the rotor from its true axial position towards either stator pole of said pair an out-of-balance current flows in the auxiliary windings tending to restore to equality the fluxes in said airgaps.

Said interconnections may include a capacitor which may have a capacitance such as to minimise the effect on the output voltage of the device of any departure from equality of the reluctances of said airgaps caused by such displacement of the rotor and/or to minimise any angular shift of the position of zero torque of the rotor from the electrical null position caused by such displacement of the rotor. The capacitor may be tuned to resonance with the auxiliary windings at approximately the frequency of said source.

The accompanying drawing is a diagrammatic representation of one embodiment of the invention.

In carrying out the invention in accordance with one form by way of example a pick-off of the type stated consists of a stator 11 having four poles 12a to 12d spaced approximately uniformly round the axis 13 of the rotor shaft 14. These poles may be considered as grouped in two pairs each of two diametrically-opposite poles 12a and 12c, and 12b and 12d, respectively. Each pole is provided with a main winding 15a, 15b, etc, as the case may be, connected in series with the main windings of the other poles to form a four-arm inductance bridge network. The bridge is energised by an A.C. source applied at two opposite points AB, CD—the common points of windings 15a and 15b, and of windings 15c and 15d respectively—and the output is derived from the other two points BC, DA.

The rotor 16, which is unwound and is secured to shaft 14, is provided with poles 17a to 17d for co-operation with the stator poles 12a to 12d, each to each. The arrangement is such that the rotor can take up at least one null position (corresponding to the datum position), as depicted, where all four airgaps 18a to 18d between its poles and the stator poles have the same value of reluctance, with the consequence that the bridge is balanced and provides zero output; and is such that the least angular movement of the rotor in one or other direction from this position increases the reluctances of one pair of diametrically-opposite airgaps—that is, the airgaps between the rotor and one pair of diametrically-opposite stator poles—whilst maintaining these reluctances equal to one another, but decreases the reluctances of the other airgaps, which also remain equal.

This result may be obtained in known manner by angularly displacing one pair of diametrically-opposite stator poles through a few degrees with respect to the other pair from the position of exact uniform spacing round the rotor axis, whilst maintaining the poles of each pair exactly diametrically-opposite one another, the rotor having its poles uniformly spaced. Thus, in the arrangement depicted, stator pole 12a is displaced towards pole 12d, whilst the remaining poles 12b and 12c remain exactly diametrically opposite poles 12d and 12a respectively. It will readily be apparent that the least angular movement of the rotor clockwise (as depicted) increases the reluctances of the pair of opposite airgaps 18a and 18c and decrease those of the other pair 18b and 18d, and vice versa. A similar result may be obtained by spacing the stator poles uniformly and slightly displacing the rotor poles. Either of such arrangements, as already indicated, is well known in pick-offs of the type stated.

Each stator pole is provided with an auxiliary winding 21a, 21b, etc., as the case may be, in addition to the main winding and conveniently wound over it. The auxiliary windings of each pair of opposite stator poles have an equal number of turns and are interconnected, as shown in the drawing, so that the voltages induced in them by the respective main windings are in counterphase with one another. Included in series with the two auxiliary windings is a capacitor 22bd, 22ac, as the case may be, the capacitance of which is approximately that required to tune the windings to resonance at the frequency of the source but which is capable of slight adjustment from this value.

It will be appreciated that the various windings are depicted in the drawing in the simplest manner so as to show clearly the relative directions in which they are wound and the way in which they are interconnected, rather than the constructional manner in which they are mounted on the respective stator poles. It is assumed that the pick-off is of the kind disclosed in the co-pending patent application of Kenneth Robson Brown and Gilroy Dawson, filed February 16, 1959, Serial No. 793,509, in which each rotor pole extends part way into the co-operating stator pole winding. The invention is however equally applicable to pick-offs of the kind in which the main windings are wholly over the stator poles; in which case the auxiliary windings may be wholly over the main windings, with the rotor poles lying wholly outside both windings.

In operation, so long as the rotor axis 13 remains in its true position with respect to the stator poles the voltages induced in the auxiliary windings 21 of each pair of stator poles are equal, since the inductances of, and hence the currents in, the main windings 15 are equal. Being in counterphase, these voltages balance one another and no current flows in the auxiliary windings of either pole pair.

Suppose now that due to some force—resulting, say, from a rapid acceleration of a craft in which the pick-off is mounted—the rotor is slightly displaced radially from its true position towards the stator pole 12a, thereby shortening the airgap 18a between this stator pole and the co-operating rotor pole 17a and increasing the flux in the gap. Were it not for the auxiliary windings the effect of this displacement would be to render the fluxes in the diametrically opposite gaps 18a and 18c no longer equal, and so disturb the accurate operation of the pick-off by shifting the position of the null point. The auxiliary windings function as follows to correct such distortion to a considerable extent.

As a result of the rotor shift the voltages of the auxiliary windings 21a and 21c of this pole pair no longer balance one another and accordingly an out-of-balance current now flows in these windings. The sense of their interconnections is such that this current sensibly restores to equality the fluxes in the airgaps 18a and 18c, thereby equalising the voltages across the corresponding main windings 15a and 15c and preserving the true position of the null point.

The operation is similar where the rotor is displaced towards one of the stator poles of the other pair, and where the displacement is compounded of movements towards a pole of each pair.

The main function of each capacitor 22ac or 22bd is of course to increase the out-of-balance current by the resonance effect. By slightly adjusting each of these components an optimum capacitance value can be found at which the effect of the departure from equality of the reluctances of opposite pole windings on displacement of the rotor is reduced to a minimum.

As already stated, another harmful effect of such a rotor shift is to displace the rotor position of zero torque. By adjusting the capacitance of the capacitor from the exact resonance value to a slight extent from the value arrived at as indicated in the previous paragraphs this distortion can be minimised also.

It will of course be appreciated that so long as the device requires for its correct operation that the inductances of each pair of diametrically-opposite stator windings should be equal for all operative positions of the rotor, the manner in which the respective stator windings are interconnected and energised is not relevant to the invention. The usual form of interconnection is some sort of bridge network, as described above.

What we claim is:

1. A pick-off device of the type for providing an alternating-current output voltage which represents by its amplitude and phase with respect to a source voltage the magnitude and direction of the angular position of a shaft with respect to a datum position, the device having at least one pair of wound stator poles of unlike polarity which are located diametrically opposite one another with respect to the axis of said shaft and which are adapted to co-operate with two rotor poles, each to each, secured to said shaft, so that the fluxes in the airgaps between the stator poles and the rotor poles are equal when the rotor is in its true axial position, including for each stator pole an auxiliary winding in addition to the main winding, and interconnections between the two auxiliary windings of said pair such that the voltages induced in the auxiliary windings by the respective main windings are in counterphase with one another, the arrangement being such that on a radial displacement of the rotor from its true axial position towards either stator pole of said pair an out-of-balance current flows in the auxiliary windings tending to restore to equality the fluxes in said airgaps.

2. A device as claimed in claim 1 wherein said interconnections include a capacitor.

3. A device as claimed in claim 2 wherein the capacitor has a capacitance such as to minimise the effect on the output voltage of the device of any departure from equality of the reluctances of the said airgaps caused by such displacement of the rotor.

4. A device as claimed in claim 2 wherein the capacitor has a capacitance such as to minimise any angular shift of the position of zero torque of the rotor from the electrical null position caused by such displacement of the rotor.

5. A device as claimed in claim 2 wherein the capacitor is tuned to resonance with the auxiliary windings at approximately the frequency of said source.

6. A pick-off device of the type for providing an alternating-current output voltage which represents by its amplitude and phase with respect to a source voltage the magnitude and direction of the angular position of a rotatable shaft with respect to a datum position, comprising a rotor secured to the shaft having at least one pair of diametrically opposite rotor poles, a stator surrounding said rotor, said rotor normally occupying a truly coaxial position relative to said stator but being radially displaceable from said position, said stator having at least one pair of diametrically opposite wound stator poles of unlike polarity which co-operate with said pair of rotor poles so that the fluxes in the airgaps between the stator poles and the rotor poles are equal when the rotor is in its truly coaxial position relative to the stator, a main winding and an auxiliary winding on each of said stator poles, said main windings being so interconnected as to form an inductance bridge network energised by said source voltage and each auxiliary winding being electrically connected in series solely with the diametrically opposite auxiliary winding to form a closed circuit, said main and auxiliary windings being so arranged that, when the rotor is in its truly coaxial position relative to the stator, the voltages induced in the diametrically opposite auxiliary windings are equal and in counterphase so that no current flows in said auxiliary windings, but on a radial displacement of the rotor from said position towards either stator pole of said pair and out-of-balance current flows in said auxiliary windings in a direction such as to tend to restore to equality the fluxes in said airgaps.

7. A device as claimed in claim 6 wherein the electrical connections between the diametrically opposite auxiliary windings include a capacitor having a capacitance approximating that required to tune said auxiliary windings to resonance at the frequency of the source voltage, but adjustable from the exact resonance value to a value such as to minimise the effect on the output voltage of the device of any departure from equality of the reluctances of said airgaps caused by a radial displacement of the rotor.

8. A device as claimed in claim 6 wherein the electrical connections between the diametrically opposite auxiliary windings include a capacitor having a capacitance approximating that required to tune said auxiliary windings to resonance at the frequency of the source voltage, but adjustable from the exact resonance value to a value such as to minimise any angular shift of the position of zero torque of the rotor from the electrical null position caused by a radial displacement of the rotor.

References Cited in the file of this patent

UNITED STATES PATENTS

| | | |
|---|---|---|
| 2,488,734 | Mueller | Nov. 22, 1949 |
| 2,596,712 | Mueller | May 13, 1952 |
| 2,630,561 | Mueller | Mar. 3, 1953 |
| 2,710,941 | Bonnell | June 14, 1955 |
| 2,842,749 | Bonnell | July 8, 1958 |
| 2,882,484 | Swainson | Apr. 14, 1959 |